(12) United States Patent
Ueki et al.

(10) Patent No.: US 10,789,492 B2
(45) Date of Patent: Sep. 29, 2020

(54) SPECIFIC OBJECT DETECTION APPARATUS

(71) Applicant: STANLEY ELECTRIC CO., LTD., Tokyo (JP)

(72) Inventors: Ryuji Ueki, Tokyo (JP); Takako Kimura, Tokyo (JP); Mitsuhiro Uchida, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 110 days.

(21) Appl. No.: 16/107,584

(22) Filed: Aug. 21, 2018

(65) Prior Publication Data

US 2019/0065870 A1 Feb. 28, 2019

(30) Foreign Application Priority Data

Aug. 23, 2017 (JP) ................................ 2017-160193

(51) Int. Cl.
| | |
|---|---|
| *G06T 7/521* | (2017.01) |
| *G06K 9/00* | (2006.01) |
| *B60Q 1/14* | (2006.01) |
| *G06K 9/62* | (2006.01) |

(52) U.S. Cl.
CPC ......... *G06K 9/00825* (2013.01); *B60Q 1/143* (2013.01); *G06K 9/6202* (2013.01); *G06T 7/521* (2017.01); *B60Q 2300/054* (2013.01); *B60Q 2300/3321* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,192,152 B1 * | 2/2001 | Funada | ................... | G06T 11/60 |
| | | | | 358/466 |
| 7,512,252 B2 * | 3/2009 | Otsuka | ................. | B60Q 1/1423 |
| | | | | 382/104 |
| 7,697,119 B2 * | 4/2010 | Ikeno | ...................... | G01S 17/36 |
| | | | | 356/4.07 |

(Continued)

FOREIGN PATENT DOCUMENTS

| | | | |
|---|---|---|---|
| JP | 4914234 B2 | 4/2012 | |
| JP | 2017097658 A | * 6/2017 | ............. B60Q 1/143 |

*Primary Examiner* — Tsung Yin Tsai
(74) *Attorney, Agent, or Firm* — Kenealy Vaidya LLP

(57) ABSTRACT

Provided is a specific object detection apparatus capable of detecting a specific object even when a self-vehicle is positioned at a distance from the specific object during bad weather. A specific object detection apparatus 20 includes: imaging means (an imaging unit) 21 which captures a specific object V1 including a light source 11 driven based on a PWM signal with a frequency f and a duty ratio D, the specific object V1 being captured at a frame rate of f/D fps or higher; detecting means (a detecting unit) 22a which detects a relatively bright area in an image captured by the imaging means (imaging unit) 21; calculating means (a calculating unit) 22b which calculates a lighting frequency of the relatively bright area detected by the detecting means (detecting unit) 22a; and determining means (a determining unit) 22c which determines that, when the lighting frequency calculated by the calculating means (calculating unit) 22b is a frequency set in advance, the relatively bright area detected by the detecting means (detecting unit) 22a is a specific object.

12 Claims, 4 Drawing Sheets

(56) References Cited

U.S. PATENT DOCUMENTS

| | | | | |
|---|---|---|---|---|
| 9,690,997 B2* | 6/2017 | Murao | ............... | G06K 9/00825 |
| 9,892,332 B1* | 2/2018 | Wendel | ............. | G06K 9/00825 |
| 2002/0003571 A1* | 1/2002 | Schofield | ............ | B60R 11/0235 |
| | | | | 348/148 |
| 2008/0180528 A1* | 7/2008 | Saito | ................. | G06K 9/00825 |
| | | | | 348/148 |
| 2010/0265330 A1* | 10/2010 | Li | ........................ | G06K 9/4604 |
| | | | | 348/148 |
| 2012/0062746 A1* | 3/2012 | Otsuka | ................ | H04N 5/2353 |
| | | | | 348/148 |
| 2012/0207205 A1* | 8/2012 | Zhao | ..................... | H05B 45/46 |
| | | | | 375/238 |
| 2017/0169301 A1* | 6/2017 | Kunze | ................ | G06K 7/10722 |

* cited by examiner ic # SPECIFIC OBJECT DETECTION APPARATUS

CROSS-REFERENCE TO RELATED APPLICATION

This application is based upon and claims the benefit of priority of the prior Japanese Patent Application No. 2017-160193, filed on Aug. 23, 2017, the entire contents of which are incorporated herein by reference.

FIELD

The present invention relates to a specific object detection apparatus.

BACKGROUND

Conventionally, vehicle detection apparatuses which include imaging means that captures images of the front of a self-vehicle and which is configured to detect a specific object (for example, a tail lamp of a preceding vehicle) from captured images based on brightness are proposed (for example, refer to Japanese Patent No. 4914234).

SUMMARY

However, the vehicle detection apparatus described in Japanese Patent No. 4914234 has a problem in that, during bad weather (for example, during an occurrence of a fog), since fog scatters and attenuates light from a specific object (for example, a tail lamp of a preceding vehicle) and the light does not reach far, the specific object is unable to be detected if a self-vehicle is located at a distance from the specific object. In other words, there is a problem that a detection distance (a distance between the specific object and the self-vehicle) over which the specific object can be detected is shorter during bad weather (for example, during an occurrence of a fog) as compared to during fine weather.

The present invention has been made in consideration of the circumstances described above and an object thereof is to provide a specific object detection apparatus capable of detecting a specific object even when a self-vehicle is positioned at a distance from the specific object during bad weather.

In order to achieve the object described above, an aspect of the present invention provides a specific object detection apparatus including: imaging means (an imaging unit) which captures a specific object including a light source driven based on a PWM signal with a frequency f and a duty ratio D, the specific object being captured at a frame rate of f/D fps or higher; detecting means (a detecting unit) which detects a relatively bright area in an image captured by the imaging means (imaging unit); calculating means (a calculating unit) which calculates a lighting frequency of the relatively bright area detected by the detecting means (detecting unit); and determining means (a determining unit) which determines that, when the lighting frequency calculated by the calculating means (calculating unit) is a frequency set in advance, the relatively bright area detected by the detecting means (detecting unit) is a specific object.

According to this aspect, even if the specific object detection apparatus is positioned at a distance from a specific object (for example, a preceding vehicle) during bad weather (for example, during an occurrence of a fog), the specific object can be detected. In other words, a detection distance (a distance between the specific object and the specific object detection apparatus) over which the specific object can be detected during bad weather (for example, during an occurrence of a fog) can be increased as compared to the conventional art described above.

This is attributable to the fact that the specific object is configured to deliver light further during bad weather or, in other words, includes a light source driven based on a PWM signal with a frequency f and a duty ratio D, and that the specific object detection apparatus is configured to detect light from the light source or, in other words, includes imaging means (an imaging unit) which captures images at a frame rate of frequency f/duty ratio D fps or higher.

In addition, in a preferred aspect of the invention described above, the calculating means (calculating unit) calculates, based on a plurality of images captured by the imaging means (imaging unit), the lighting frequency of the relatively bright area detected by the detecting means (detecting unit).

Furthermore, in a preferred aspect of the invention described above, the specific object is a vehicle including the light source.

DESCRIPTION OF EMBODIMENTS

Hereinafter, a specific object detection apparatus representing an embodiment of the present invention will be described with reference to the accompanying drawings. Corresponding components in the respective drawings will be denoted by same reference signs and redundant descriptions thereof will be omitted.

Figure 1:
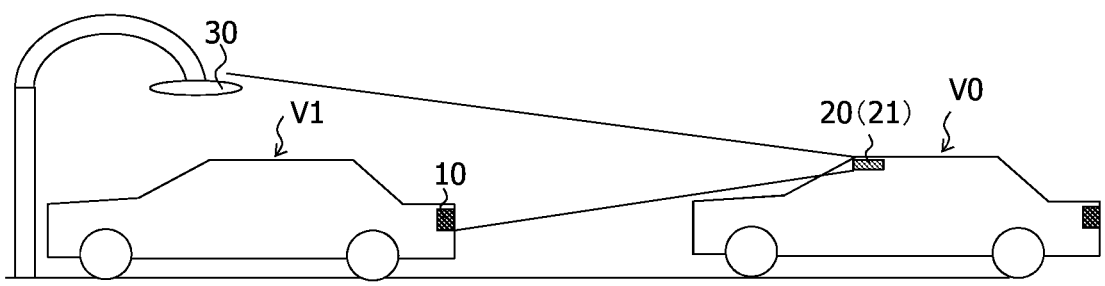
FIG. 1 is a diagram for explaining an example of an environment in which a specific object detection apparatus 20 is used.

FIG. 1 is a diagram for explaining an example of an environment in which a specific object detection apparatus 20 according to the present embodiment is used. FIG. 1 illustrates a self-vehicle V0, a preceding vehicle V1 positioned ahead of the self-vehicle V0, and a street light 30.

As illustrated in FIG. 1, the preceding vehicle V1 is provided with a tail lamp 10 and the self-vehicle V0 is provided with the specific object detection apparatus 20. Hereinafter, an example in which a specific object is the preceding vehicle V1 (the tail lamp 10) will be described.

Figure 2A:
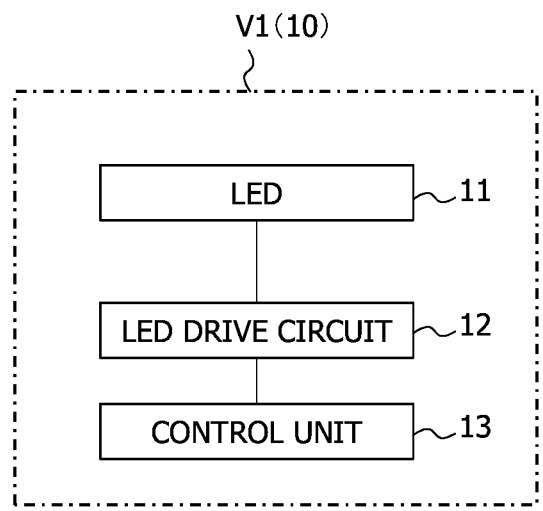
FIG. 2A is a schematic configuration diagram of a tail lamp 10 provided on a preceding vehicle V1.

FIG. 2A is a schematic configuration diagram of the tail lamp 10 provided on the preceding vehicle V1.

As illustrated in FIG. 2A, the tail lamp 10 includes an LED 11, an LED drive circuit 12, and a control unit 13. Although not illustrated, the tail lamp 10 includes an optical system such as a lens or a reflector which controls light from the LED 11. The tail lamp 10 is provided in a rear end part of the preceding vehicle V1.

Figure 3:
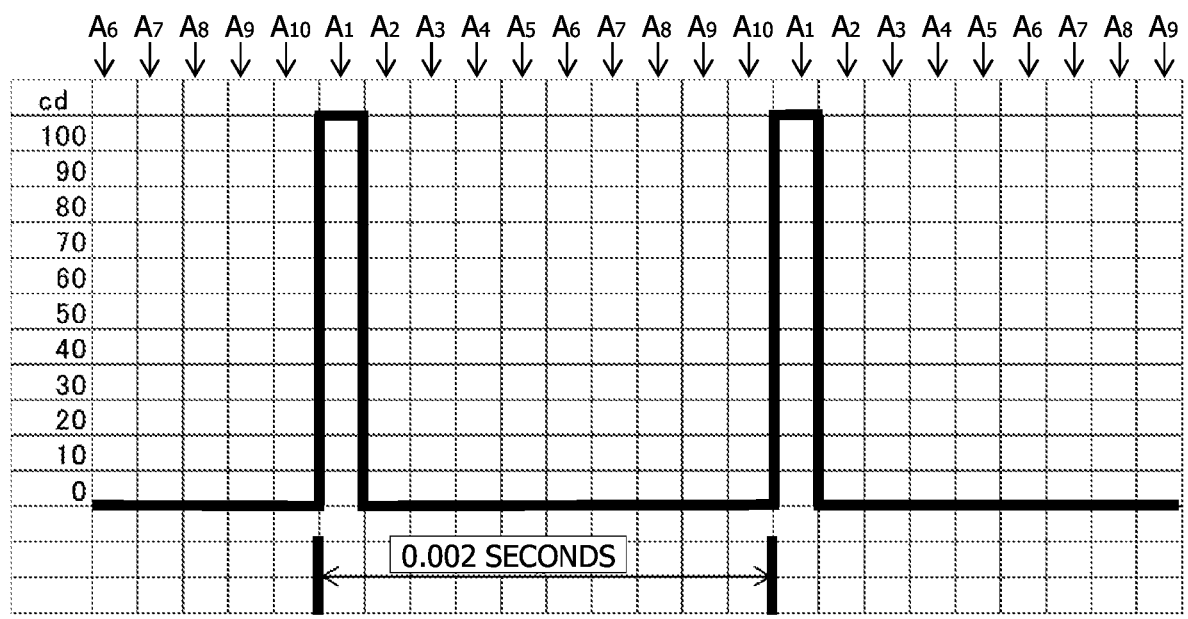
FIG. 3 represents an example of a lighting waveform of the tail lamp 10 (LED 11)

FIG. 3 represents an example of a lighting waveform of the tail lamp 10 (LED 11). As illustrated in FIG. 3, for example, for every 0.002 seconds, the tail lamp 10 (LED 11) is lit at 100 cd for 0.0002 seconds and turned off for the remaining 0.0018 seconds. When the tail lamp 10 (LED 11) is flickered at high speed in this manner, it appears as though the tail lamp 10 (LED 11) is dimly lit (for example, lit at 10 cd) to the human eye.

The lighting waveform illustrated in FIG. 3 is realized by, for example, applying a PWM signal with a frequency f and a duty ratio D output by the control unit 13 to a switching element (not illustrated) such as a bipolar transistor included in the LED drive circuit 12. Hereinafter, an example in which frequency f=500 Hz and duty ratio D=10% will be described. Moreover, as the LED drive circuit 12, for example, a known LED drive circuit described in Japanese Patent Application Laid-open No. 2017-085676 or the like can be used.

The switching element is provided between, for example, a power supply (not illustrated) of a DC-DC converter or the like and the LED 11. When a PWM signal with a frequency of 500 Hz and a duty ratio of 10% is applied to the switching element, for every 0.002 seconds, the switching element is turned on for 0.0002 seconds (as a result, drive voltage is applied to the LED 11 from the power supply) and turned off for the remaining 0.0018 seconds (as a result, drive voltage is not applied to the LED 11 from the power supply). Accordingly, as illustrated in FIG. 3, for every 0.002 seconds, the tail lamp 10 is lit at 100 cd for 0.0002 seconds and turned off for the remaining 0.0018 seconds. Moreover, the drive voltage is voltage designed to light the tail lamp 10 at, for example, a maximum luminosity demanded by law (for example, 10 cd)/duty ratio D=10/(10/100)=100 cd.

Driving the LED 11 with drive voltage applied based on a PWM signal with a frequency f and a duty ratio D as described above creates the following advantage.

In the conventional art described earlier, since a tail lamp is constantly lit at a constant luminosity such as the maximum luminosity demanded by law (for example, 10 cd), during bad weather (particularly, during an occurrence of a fog), light from the tail lamp is scattered and attenuated by fog and does not reach far. Therefore, when a self-vehicle is positioned at a distance from a preceding vehicle during bad weather, the preceding vehicle is unable to be detected. In other words, a detection distance (a distance between the preceding vehicle V1 and the self-vehicle V0) over which the preceding vehicle V1 can be detected is shorter during bad weather (for example, during an occurrence of a fog) as compared to during fine weather.

In contrast, in the present embodiment, since the tail lamp 10 is instantaneously (for example, for 0.0002 seconds) lit at 100 cd (refer to FIG. 3), light from the tail lamp 10 reaches farther during bad weather. Therefore, even when the self-vehicle V0 is positioned at a distance from the preceding vehicle V1 during bad weather, the preceding vehicle V1 can be detected. In other words, the detection distance (the distance between the preceding vehicle V1 and the self-vehicle V0) over which the preceding vehicle V1 can be detected during bad weather (for example, during an occurrence of a fog) can be extended as compared to the conventional art described above. Moreover, a driver or the like does not experience glare when the tail lamp 10 is instantaneously (for example, for 0.0002 seconds) lit at 100 cd. This is due to the fact that when the tail lamp 10 (LED 11) is flickered at high speed (for example, 500 Hz), it appears as though the tail lamp 10 (LED 11) is dimly lit (for example, lit at 10 cd) to the human eye.

The frequency f of the PWM signal is not limited to 500 Hz. The frequency f of the PWM signal may be any frequency which differs from that of other light sources present in a traffic environment such as the street light 30 and which is not perceived as flicker by the human eye. In addition, the duty ratio D of the PWM signal is not limited to 10%. The duty ratio D of the PWM signal need only be lower than 100%. Although a smaller duty ratio D is desirable from the perspective of extending the detection distance, a smaller duty ratio D inversely necessitates an LED with higher output. In consideration thereof, the duty ratio D is desirably 20% or lower and particularly desirably ranges from 5% to 20%.

Although not illustrated, the control unit 13 includes a CPU, a RAM, a ROM, and the like. The CPU of the control unit 13 applies a PWM signal with a frequency f and a duty ratio D to the LED drive circuit 12 (switching element) by executing a program having been read from the ROM to the RAM. In the present embodiment, a PWM signal with a frequency of 500 Hz and a duty ratio of 10% is applied.

Figure 2B:
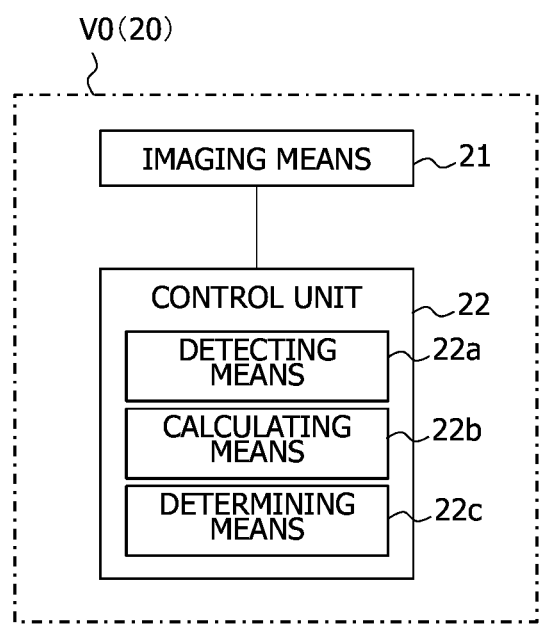
FIG. 2B is a schematic configuration diagram of the specific object detection apparatus 20 provided on a self-vehicle V0.

FIG. 2B is a schematic configuration diagram of the specific object detection apparatus 20 provided on the self-vehicle V0.

As illustrated in FIG. 2B, the specific object detection apparatus 20 includes imaging means 21, a control unit 22, and the like.

The imaging means 21 is, for example, a camera (including imaging devices such as a CCD sensor and a CMOS sensor) which captures images of the front of the self-vehicle V0 and which is provided at a prescribed location (for example, inside a cabin) of the self-vehicle V0. A photodiode may be used as the imaging means 21.

The imaging means 21 captures images at a frame rate of frequency f/duty ratio D fps or higher. In the present embodiment, imaging is performed at a frame rate of 500/(10/100)=5000 fps. Accordingly, for every 0.002 seconds, a total of 10 images constituted by one image including the tail lamp 10 (the preceding vehicle V1) lit at 100 cd and nine images including the tail lamp 10 (the preceding vehicle V1) turned off can be captured. The image including the tail lamp 10 (the preceding vehicle V1) lit at 100 cd is captured at, for example, a timing denoted by an arrow $A_1$ illustrated in FIG. 3. The images including the tail lamp 10 (the preceding vehicle V1) turned off are captured at, for example, timings denoted by arrows $A_2$ to $A_{10}$ illustrated in FIG. 3.

Due to the imaging means 21 capturing images at a frame rate of frequency f/duty ratio D fps or higher as described above, for example, even when a lighting timing of the tail lamp 10 and an imaging timing of the imaging means 21 deviate from each other, an image including the tail lamp 10 (the preceding vehicle V1) lit at 100 cd can be reliably captured. Images (image data) captured by the imaging means 21 are input to the control unit 22.

Although not illustrated, the control unit 22 includes a CPU, a RAM, a ROM, and the like.

The CPU of the control unit 22 functions as detecting means 22a which detects a relatively bright area in an image captured by the imaging means 21 by executing a program having been read from the ROM to the RAM.

A relatively bright area can be detected by, for example, detecting a pixel area of which brightness is equal to or higher than a threshold in an image captured by the imaging means 21.

In addition, the CPU of the control unit 22 functions as calculating means 22b which calculates a lighting frequency of the relatively bright area detected by the detecting means 22a by executing a program having been read from the ROM to the RAM.

The lighting frequency of a relatively bright area can be calculated based on a plurality of images captured by the imaging means 21.

For example, let us assume that the detecting means 22a detects a relatively bright area at a rate of one in every ten images from the plurality of images captured by the imaging means 21. In this case, an interval at which an image including a relatively bright area appears is 0.002 seconds. Therefore, in this case, the lighting frequency of a relatively bright area can be calculated as 1/0.002=500 Hz.

Furthermore, the CPU of the control unit 22 functions as determining means 22c which determines whether or not the lighting frequency calculated by the calculating means 22b is a frequency set in advance and, when the calculated lighting frequency is the frequency set in advance, determines that the relatively bright area detected by the detecting means 22a is the tail lamp 10 (the preceding vehicle V1) by executing a program having been read from the ROM to the RAM. The frequency set in advance is stored in, for example, a storage unit such as the ROM of the control unit 22 at the frequency f (in this case, 500 Hz). Moreover, the frequency set in advance may be a numerical range such as 500 Hz±10 Hz.

The street light 30 is, for example, a mercury lamp and is lit at a frequency (for example, 100 Hz) which differs from that of the tail lamp 10 included in the preceding vehicle V1.

Figure 4:
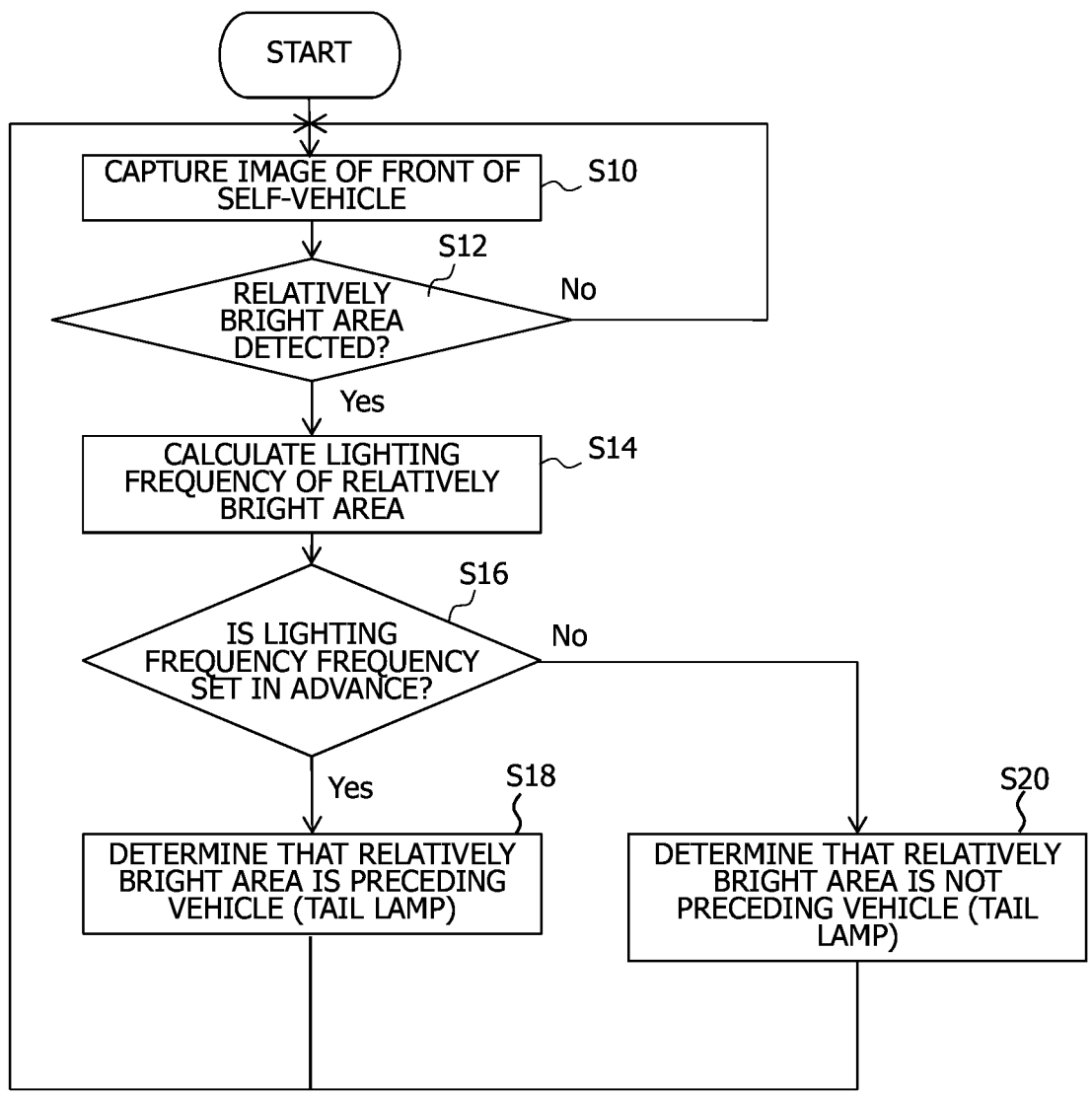
FIG. 4 is a flow chart for explaining an operation of the specific object detection apparatus 20 mounted on the self-vehicle V0.

FIG. 4 is a flow chart for explaining an operation of the specific object detection apparatus 20 mounted on the self-vehicle V0.

Processes described below are mainly executed as the CPU of the control unit 22 executes a program having been read from the ROM to the RAM.

Hereinafter, a description will be given on the assumption that the preceding vehicle V1 and the street light 30 are positioned ahead of the self-vehicle V0 during night time as illustrated in FIG. 1. It is assumed that the tail lamp 10 of the preceding vehicle V1 is lit at the lighting waveform illustrated in FIG. 3 and that the street light 30 is lit at a frequency (for example, 100 Hz) which differs from that of the tail lamp 10 of the preceding vehicle V1.

First, the imaging means 21 captures an image of the front of the self-vehicle V0 (step S10). In other words, the imaging means 21 captures an image including the preceding vehicle V1 (the tail lamp 10) positioned ahead of the self-vehicle V0, and the street light 30 at a frame rate of 5000 fps.

Next, the CPU (the detecting means 22a) of the control unit 22 detects a relatively bright area in the image captured by the imaging means 21 (step S12).

In this case, an area corresponding to the tail lamp 10 of the preceding vehicle V1 and an area corresponding to the street light 30 are detected as relatively bright areas (step S12: Yes).

Next, the CPU (the calculating means 22b) of the control unit 22 calculates a lighting frequency of the relatively bright areas detected by the detecting means 22a (step S14).

For example, let us assume that the detecting means 22a detects a relatively bright area (the area corresponding to the tail lamp 10 of the preceding vehicle V1) at a rate of one in every ten images from the plurality of images captured by the imaging means 21. In this case, an interval at which an image including the relatively bright area (the area corresponding to the tail lamp 10 of the preceding vehicle V1) appears is 0.002 seconds. Therefore, in this case, the lighting frequency of the relatively bright area (the area corresponding to the tail lamp 10 of the preceding vehicle V1) can be calculated as 1/0.002=500 Hz.

In a similar manner, the lighting frequency of a relatively bright area (the area corresponding to the street light 30) can be calculated as, for example, 100 Hz.

Next, the CPU (the determining means 22c) of the control unit 22 determines whether or not the lighting frequency calculated by the calculating means 22b is the frequency f (in this case, 500 Hz) set in advance (step S16).

As a result, when the calculated lighting frequency is the frequency f set in advance (step S16: Yes), the CPU (the determining means 22c) of the control unit 22 determines that the relatively bright area detected by the detecting means 22a is the preceding vehicle V1 (the tail lamp 10) (step S18).

In this case, the lighting frequency of the relatively bright area (the area corresponding to the tail lamp 10 of the preceding vehicle V1) calculated in step S14 is 500 Hz which is the frequency f set in advance (step S16: Yes). Therefore, the relatively bright area (the area corresponding to the tail lamp 10 of the preceding vehicle V1) is determined as the preceding vehicle V1 (the tail lamp 10) (step S18).

In this case, a possibility of a collision with the determined (detected) preceding vehicle V1 may be determined, and a warning may be issued in the self-vehicle V0 to alert a driver or automatic steering or automatic brake control may be performed by the self-vehicle V0 to avoid a collision.

On the other hand, as a result of the determination in step S16, when the calculated lighting frequency is not the frequency f set in advance (step S16: No), the CPU (the determining means 22c) of the control unit 22 determines that the relatively bright area detected by the detecting means 22a is not the preceding vehicle V1 (the tail lamp 10) (step S20).

In this case, the lighting frequency of the relatively bright area (the area corresponding to the street light 30) calculated in step S14 is 100 Hz which is not the frequency f set in advance (step S16: No). Therefore, the relatively bright area (the area corresponding to the street light 30) is determined not to be the preceding vehicle V1 (the tail lamp 10) (step S20).

As described above, according to the present embodiment, even when the self-vehicle V0 is positioned at a distance from the preceding vehicle V1 during bad weather (for example, during an occurrence of a fog), the preceding vehicle V1 can be detected. In other words, the detection distance (the distance between the preceding vehicle V1 and the self-vehicle V0) over which the preceding vehicle V1 can be detected during bad weather (for example, during an occurrence of a fog) can be extended as compared to the conventional art described above.

This is attributable to the fact that the preceding vehicle V1 is configured to deliver light from the tail lamp 10 further during bad weather or, in other words, includes the LED 11 driven by drive voltage applied based on a PWM signal with a frequency f and a duty ratio D and, as a result, the tail lamp 10 is instantaneously (for example, for 0.0002 seconds) lit at a higher luminosity (for example, 100 cd) than the maximum luminosity demanded by law (refer to FIG. 3), and that the self-vehicle V0 is configured to detect the light with the high luminosity or, in other words, includes the imaging means 21 which captures images at a frame rate of frequency f/duty ratio D fps or higher.

Moreover, a driver or the like does not experience glare when the tail lamp 10 is instantaneously (for example, for 0.0002 seconds) lit at a higher luminosity (for example, 100 cd) than the maximum luminosity demanded by law. This is due to the fact that when the tail lamp 10 (LED 11) is flickered at high speed (for example, 500 Hz), it appears as though the tail lamp 10 (LED 11) is dimly lit (for example, lit at 10 cd) to the human eye.

As described above, according to the present embodiment, the detection distance (the distance between the preceding vehicle V1 and the self-vehicle V0) over which the preceding vehicle V1 can be detected during bad weather (for example, during an occurrence of a fog) can be extended as compared to the conventional art described above without creating glare for the driver or the like.

In addition, according to the present embodiment, a fixed light source present in a traffic environment such as the street light 30 can be prevented from being erroneously determined as the preceding vehicle V1.

This is due to the fact that when the lighting frequency of a relatively bright area is a frequency set in advance (step S16: Yes), the relatively bright area is determined as the preceding vehicle V1 (the tail lamp 10) (step S18).

Next, modifications will be described.

While an example in which the LED 11 is used as a light source which is driven by drive voltage applied based on a PWM signal with a frequency f and a duty ratio D has been described in the embodiment presented above, the light source is not limited to the LED 11. For example, an LD or an organic EL panel may be used in place of the LED 11.

In addition, while an example in which a specific object is the preceding vehicle V1 (the tail lamp 10) has been described in the embodiment presented above, the specific object is not limited to the preceding vehicle V1 (the tail lamp 10). For example, the specific object may be an oncoming vehicle (a vehicular head light).

Furthermore, while an example in which a vehicle lamp including a light source driven by drive voltage applied based on a PWM signal with a frequency f and a duty ratio D is the tail lamp 10 has been described in the embodiment presented above, the vehicle lamp including a light source driven by drive voltage applied based on a PWM signal with a frequency f and a duty ratio D is not limited to the tail lamp 10. For example, the vehicle lamp including a light source driven by drive voltage applied based on a PWM signal with a frequency f and a duty ratio D may be a vehicular head light (head lamp), a rear fog lamp, or other vehicle lamps.

The respective numerical values presented in the respective embodiments described above are used by way of example only and, obviously, different appropriate numerical values can be used.

The respective embodiments described above are to be considered in all respects as illustrative and not restrictive. The present invention is not to be taken in a limited sense based on the description of the respective embodiments presented above. The present invention may be embodied in various other forms without departing from the spirit or primary characteristics thereof.

What is claimed is:

1. A vehicle detection apparatus comprising:
   imaging means which captures an other vehicle including a light source driven based on a PWM signal with a frequency f and a duty ratio D, the other vehicle being captured at a frame rate of f/D fps or higher;
   detecting means which detects a relatively bright area in a plurality of images captured by the imaging means;
   calculating means which calculates a lighting frequency of the relatively bright area in the plurality of images detected by the detecting means; and
   determining means which determines, when the lighting frequency calculated by the calculating means is within a frequency range set in advance, that the relatively bright area detected by the detecting means is the light source of the other vehicle, wherein
   the calculating means calculates, based on an interval at which images including the relatively bright area among the plurality of images captured by the imaging means appear, the lighting frequency of the relatively bright area in the plurality of images detected by the detecting means.

2. The vehicle detection apparatus according to claim 1, wherein the duty ratio D is within a range from 5% to 20%.

3. A vehicular lamp comprising:
   a light source unit; and
   a detection device unit, wherein
   the light source unit includes a light source, a driving circuit that drives the light source and a controller,
   the light source is driven when a PWM signal with a frequency f and a duty ratio D output by the controller is applied to the driving circuit, and lit at a higher luminosity than the maximum luminosity demanded by law, and
   the detection device includes
      an imaging device that captures an other vehicle at a frame rate of f/D fps or higher, and
      a processor that detects a relatively bright area in a plurality of images captured by the imaging device, calculates a lighting frequency of the relatively bright area in the plurality of images, and determines, when the lighting frequency is within a frequency range set in advance, that the relatively bright area is the light source unit of the other vehicle.

4. The vehicular lamp according to claim 3, wherein the processor calculates, based on an interval at which images including the relatively bright area among the plurality of images appear, the lighting frequency of the relatively bright area in the plurality of images.

5. The vehicular lamp according to claim 3, wherein the duty ratio D is within a range from 5% to 20%.

6. The vehicular lamp according to claim 3, wherein the light source is any one of a light emitting device, a light detector and an organic electro-luminescence.

7. The vehicular lamp according to claim 3, wherein the light source unit is any one of a tail lamp, a head lamp and a rear fog light.

8. A vehicle comprising:
   a vehicular lamp; and
   a detection device unit, wherein
   the vehicular lamp includes a light source, a driving circuit that drives the light source and a controller,
   the light source is driven when a PWM signal with a frequency f and a duty ratio D output by the controller is applied to the driving circuit, and lit at a higher luminosity than the maximum luminosity demanded by law, and
   the detection device includes
      an imaging device that captures an other vehicle at a frame rate of f/D fps or higher, and
      a processor that detects a relatively bright area in a plurality of images captured by the imaging device, calculates a lighting frequency of the relatively bright area in the plurality of images, and determines, when the lighting frequency is within a frequency range set in advance, that the relatively bright area is the vehicle lamp of the other vehicle.

9. The vehicle according to claim 8, wherein
   the processor calculates, based on an interval at which images including the relatively bright area among the plurality of images appear, the lighting frequency of the relatively bright area in the plurality of images.

10. The vehicle according to claim 8, wherein the duty ratio D is within a range from 5% to 20%.

11. The vehicle according to claim 8, wherein the light source is any one of a light emitting device, a light detector and an organic electro-luminescence.

12. The vehicle according to claim 8, wherein the vehicular lamp is any one of a tail lamp, a head lamp and a rear fog light.

* * * * *